(12) United States Patent
Mills

(10) Patent No.: US 7,083,145 B2
(45) Date of Patent: Aug. 1, 2006

(54) CREW REST MODULE AND METHOD OF FORMING SAME

(75) Inventor: Christopher J Mills, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/949,409

(22) Filed: Sep. 24, 2004

(65) Prior Publication Data

US 2006/0065783 A1 Mar. 30, 2006

(51) Int. Cl.
*B64D 11/00* (2006.01)
(52) U.S. Cl. .................................. 244/118.5
(58) Field of Classification Search ............... 244/119, 244/118.5, 118.6; 105/314–321; 5/8, 9 R; 297/458, 468, 245
See application file for complete search history.

(56) References Cited

U.S. PATENT DOCUMENTS

| | | | |
|---|---|---|---|
| 2,914,001 A * | 11/1959 | Murphy | 105/315 |
| 3,784,989 A * | 1/1974 | LeGrand | 5/9.1 |
| 4,066,227 A | 1/1978 | Buchsel | |
| 4,686,908 A | 8/1987 | Legrand | |
| 5,115,999 A | 5/1992 | Buchsel et al. | |
| 5,314,143 A | 5/1994 | Luria | |
| 5,784,836 A | 7/1998 | Ehrick | |
| 6,003,813 A * | 12/1999 | Wentland et al. | 244/118.5 |
| 6,056,239 A | 5/2000 | Cantu et al. | |
| 6,073,883 A | 6/2000 | Ohlmann et al. | |
| 6,182,926 B1 | 2/2001 | Moore | |
| 6,305,645 B1 | 10/2001 | Moore | |
| 6,464,169 B1 | 10/2002 | Johnson et al. | |
| 6,520,451 B1 | 2/2003 | Moore | |
| 6,581,876 B1 | 6/2003 | Cheung | |
| 6,616,098 B1 | 9/2003 | Mills | |
| 6,659,225 B1 | 12/2003 | Olliges et al. | |

* cited by examiner

Primary Examiner—Galen Barefoot
(74) Attorney, Agent, or Firm—Harness Dickey & Pierce P.L.C.

(57) ABSTRACT

A crew rest module for use in a mobile platform, particularly on commercial aircraft. The crew rest module in one implementation forms a pair of laterally adjacent crew rest compartments that each include a reclinable seat and a dedicated stairway for ingress and egress. The crew rest compartments are further elevated above a main floor of the cabin of a mobile platform to provide a degree of storage space underneath the crew rest compartments. Another embodiment provides a crew rest module having upper and lower crew rest compartments, with each compartment including a berth and a seat disposed laterally adjacent its associated berth. A stairway allows access to the upper crew rest compartment. Each of the modules provide a highly space efficient area that can accommodate a pair of crew members simultaneously and provide a degree of privacy for each crew member for rest and relaxation. The module further makes efficient use of the crown area of a commercial aircraft.

6 Claims, 6 Drawing Sheets

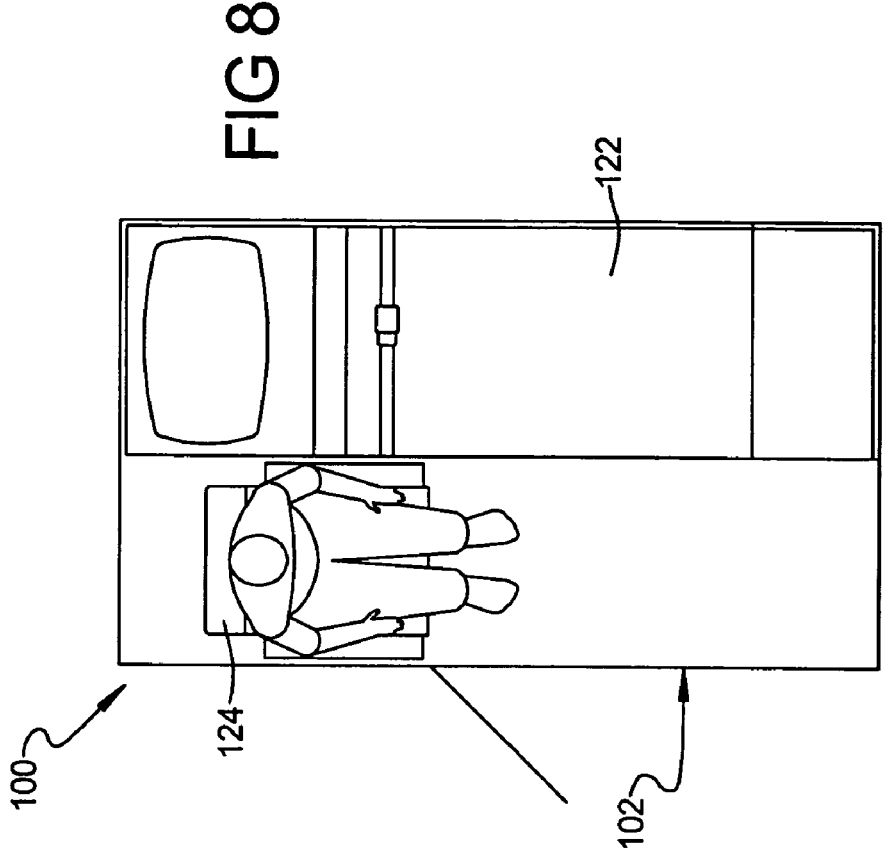
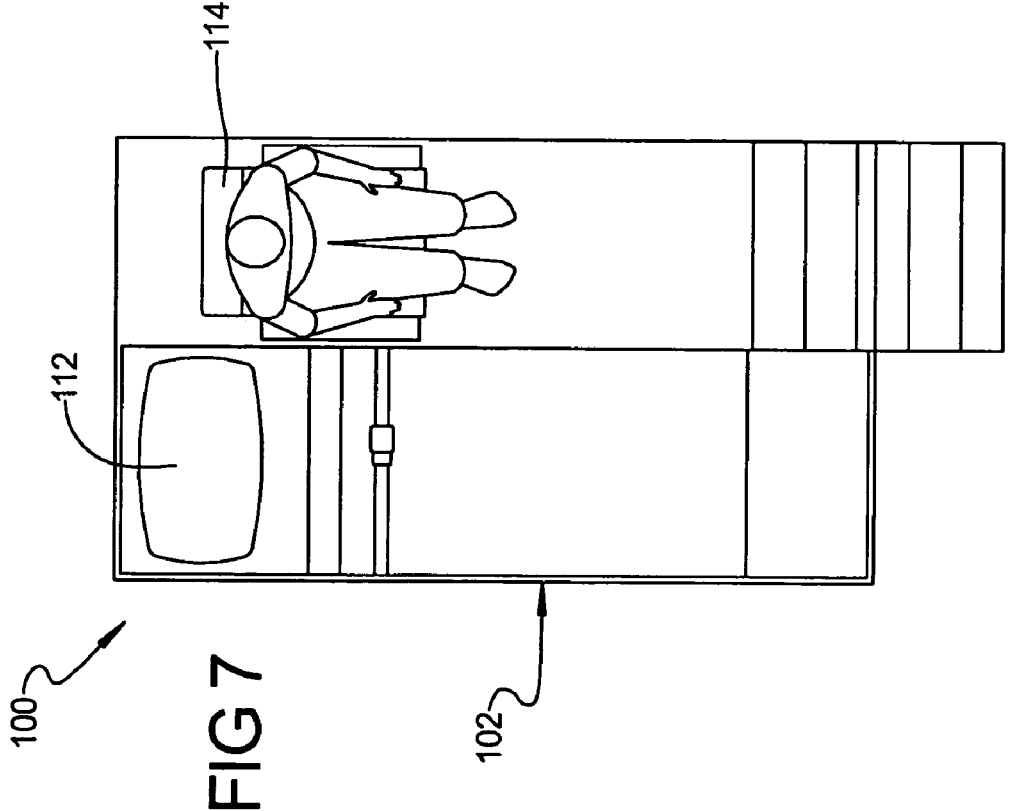

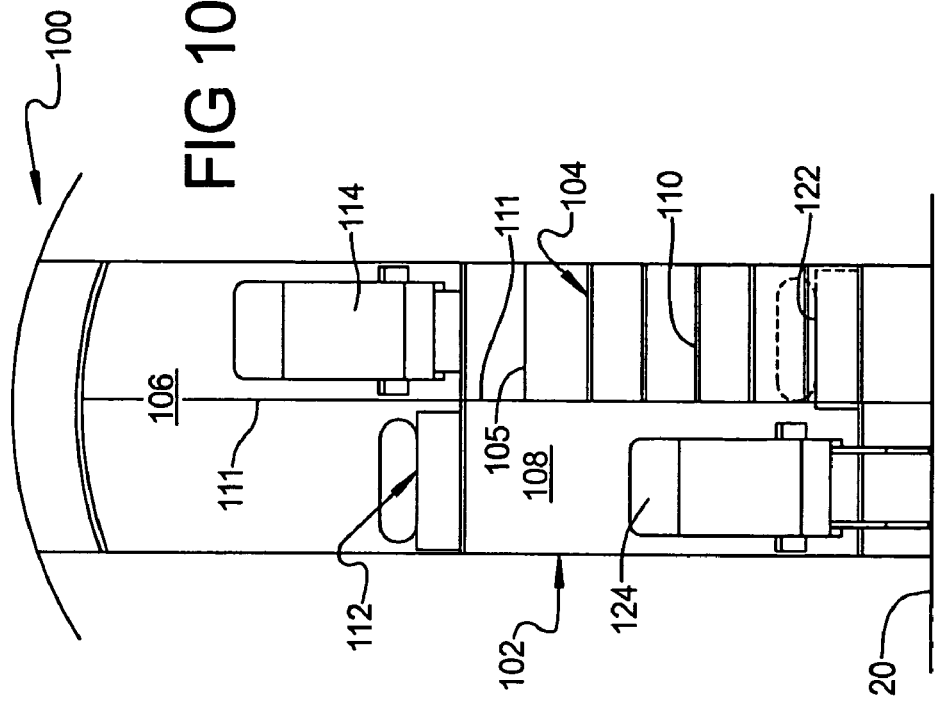
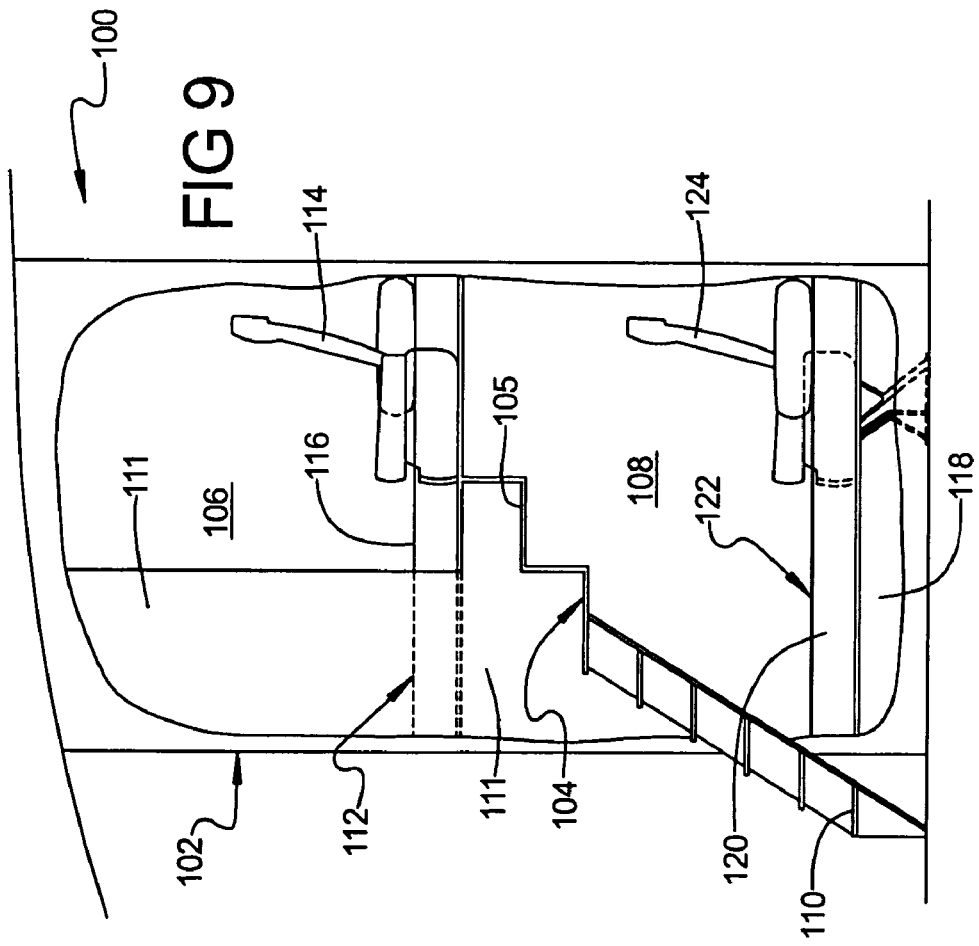

CREW REST MODULE AND METHOD OF FORMING SAME

FIELD OF THE INVENTION

The present invention relates to crew rest modules used on mobile platforms, and more particularly to a crew rest module that provides a pair of adjacently disposed crew rest compartments.

BACKGROUND OF THE INVENTION

On mobile platforms such as commercial aircraft, buses, trains, ships, etc., crew members often must work for extended periods of time before the mobile platform reaches its destination. It is highly advantageous if members of the crew have an area that they can repose to for brief rest periods away from other activities taking place on board the mobile platform. Such crew rest areas should ideally provide an additional degree of privacy to the crew members when the crew members are resting, and even more preferably provide a place where a crew member can lay down and relax.

On many forms of mobile platforms, and particularly on commercial aircraft, space for crew rest areas is very limited. Space may be found at the forward or aft end of the aircraft, in a passenger cabin area, or near the flight deck, depending upon the size and configuration of the particular aircraft. Therefore, it would be especially desirable to provide a crew rest module that can be adapted for use on a mobile platform where space is extremely limited, and particularly on a commercial aircraft. It would also be highly desirable if the crew rest module could accommodate a pair of individuals simultaneously while providing a very limited footprint, and thus form a highly space efficient structure up in the mobile platform.

SUMMARY OF THE INVENTION

The present invention is directed to a crew rest module that is especially well adapted for use in a mobile platform. In one preferred implementation the crew rest module is especially well adapted for use in a commercial aircraft.

The crew rest module of the present invention, in one preferred form, comprises a pair of crew rest compartments disposed adjacent one another within a peripheral wall structure that forms at least a partial enclosure. Each crew rest compartment includes at least a seat for accommodating a single individual. In one specific implementation, the crew rest compartments are disposed adjacent one another by a common floor portion, with the seats facing in opposite longitudinal directions. Each of the seats can be reclined to allow the occupant to either sit upright or lay down within his/her crew rest compartment. Both of the crew rest compartments are accessible by independent stairways and storage space is available underneath the floor supporting the seats.

In an alternative preferred embodiment, each crew rest compartment is formed by a plurality of peripheral walls that define an enclosure having an upper crew rest compartment and a lower crew rest compartment. Each of the crew rest compartments includes a berth and a seat disposed laterally adjacent the berth. The seat within the lower crew rest compartment is laterally offset from the position of the seat in the upper crew rest compartment, which provides an additional degree of headroom above each seat. A stairway allows access to the upper crew rest compartment while only minimally encroaching on the area within the lower crew rest compartment.

The various preferred embodiments all present highly space efficient crew rest modules that provide an added degree of privacy to crew members who may need to take periodic rests during long trips onboard a mobile platform. The various preferred embodiments further each provide a relatively small footprint in relation to the available area used for providing both seated and laying rest spaces within the crew rest module. A further advantage is that the various preferred embodiments can be occupied simultaneously by a pair of individuals who are able to either sit, recline, or lay down within their associated crew rest compartments. There is no need for one individual to leave his/her crew rest compartment before a second individual is able to enter and occupy the other crew rest compartment.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 7 is a plan view of the upper seat/berth area of the crew rest module of FIG. 6;

FIG. 8 is a plan view of the lower seat/berth area of the crew rest module of FIG. 6; and FIG. 9 is a side view of the crew rest module with one wall portion partially cut away to reveal the interior area of the module; and FIG. 10 is a front view of the crew rest module with a portion of a wall portion broken away.

DETAILED DESCRIPTION OF THE PREFERRED EMBODIMENTS

The following description of the preferred embodiment(s) is merely exemplary in nature and is in no way intended to limit the invention, its application, or uses.

Figure 1:
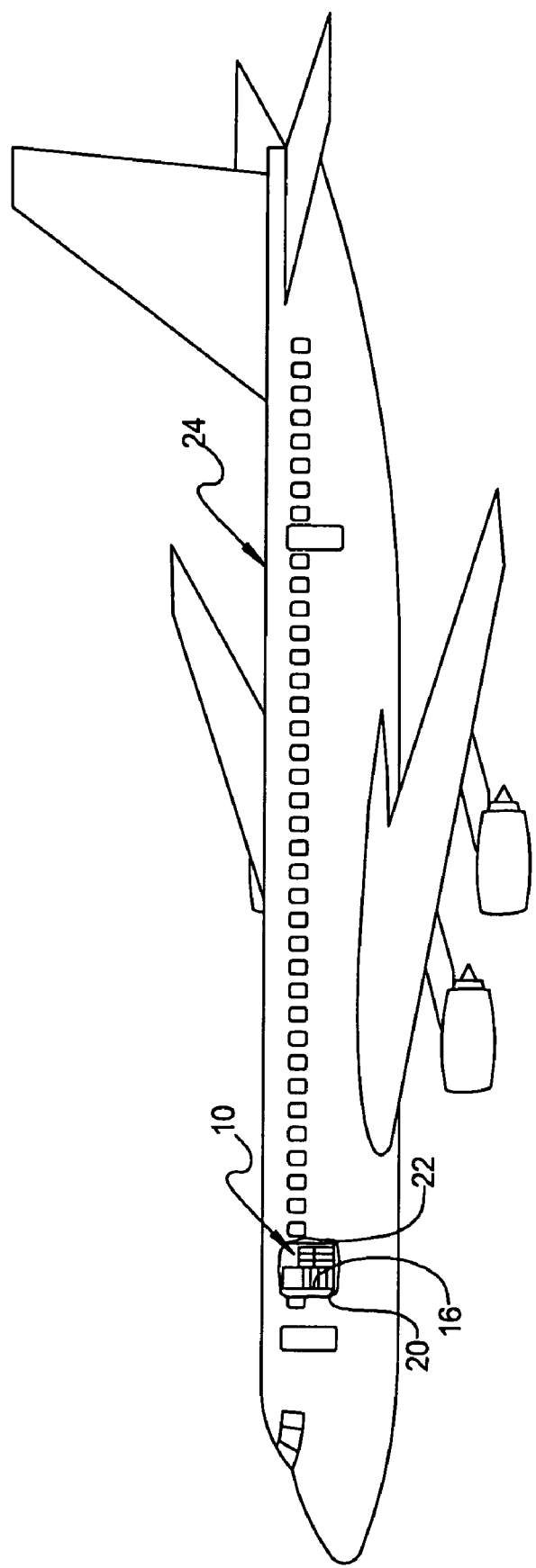
FIG. 1 is a side view of a commercial aircraft with a portion of the fuselage broken away to illustrate a crew rest module at a forward end of the aircraft.
Figure 2:
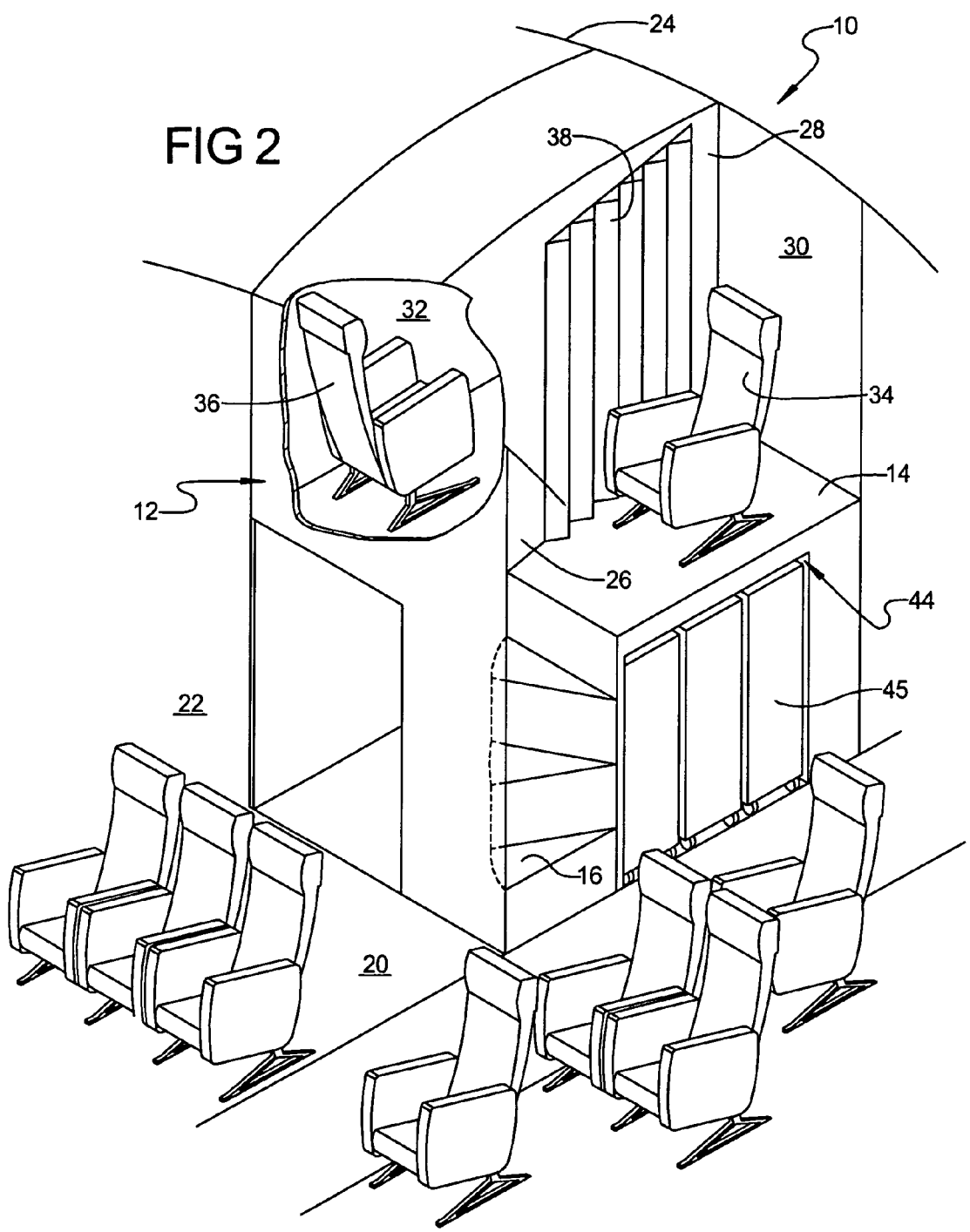
FIG. 2 is a perspective view of a crew rest module shown in FIG. 1.
Figure 3:
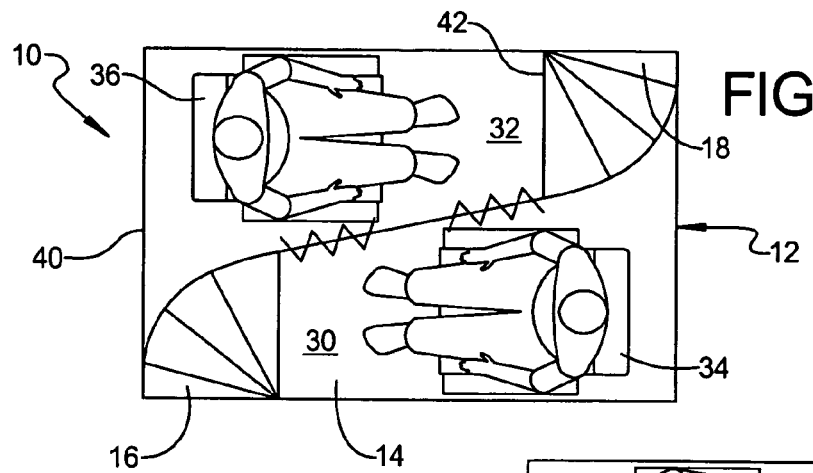
FIG. 3 is a plan view of the crew rest module of FIG. 2.
Figure 4:
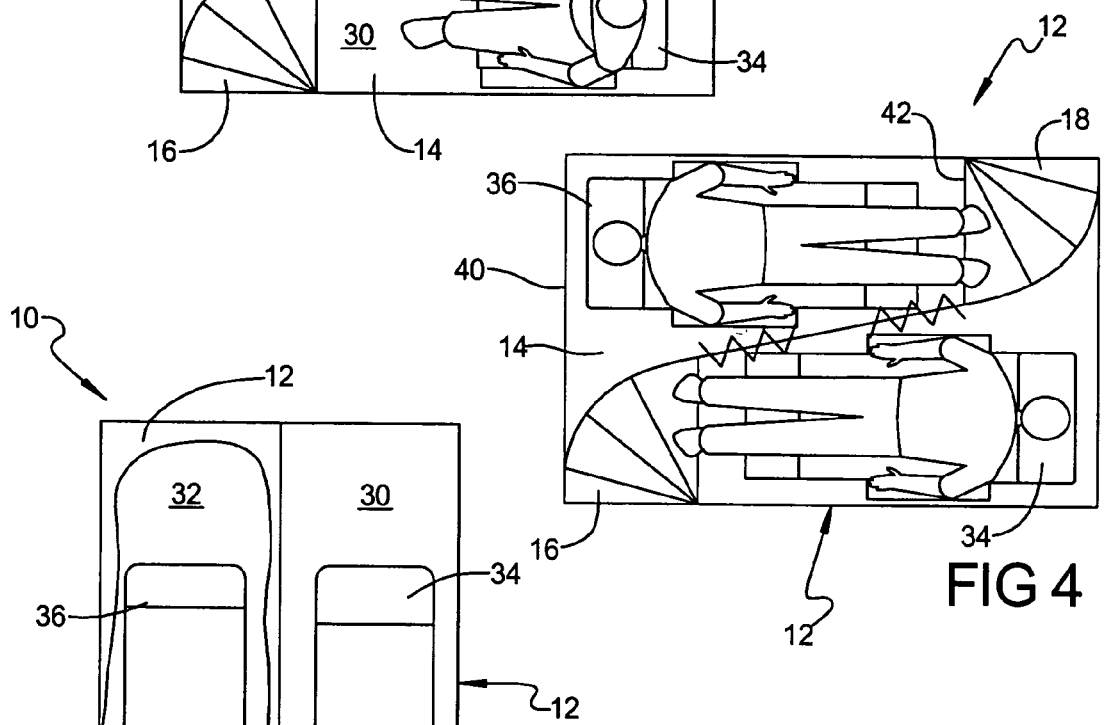
FIG. 4 is a view of the module of FIG. 3 but with two crew members shown in laying positions.

Referring to FIG. 1, there is shown a crew rest module 10 in accordance with a preferred embodiment of the present invention inside a mobile platform 24. The crew rest module 10 is shown disposed at an aft end of the mobile platform, but it could just as easily be located at a different location. Referring to FIGS. 2–4, the crew rest module 10 includes a peripheral wall structure 12, a first stairway 16 leading to an elevated floor 14, and a stairway 18 located diagonally opposite the first stairway 16 that also leads to the floor 14. The floor 14 is supported above a floor 20 of a cabin area 22 of the mobile platform 24. The mobile platform 24 may comprise a commercial aircraft, bus, train, ship or any other structure where it is desirable to provide a highly space efficient area for crew members to periodically rest. It is anticipated that if a mobile platform in the form of a commercial aircraft is used, that the module 10 will be especially well suited for use in an aircraft having a pair of aisles, where the module 10 can be located in between the two aisles. This would maximize the vertical room available for the module 10.

With further reference to FIGS. 2 and 3, the peripheral wall structure 12 of the crew rest module 10, together with interior wall portions 26 and 28, form a pair of laterally adjacent crew rest compartments 30 and 32. Crew rest compartment 30 includes a seat 34 that is able to recline to enable an occupant to either sit upright or lay substantially flat. Crew rest compartment 32 similarly includes a recline-able seat 36 that also enables the occupant to either sit upright or to recline. A curtain 38 may also separate the two crew rest areas 30 and 32.

Figure 5:
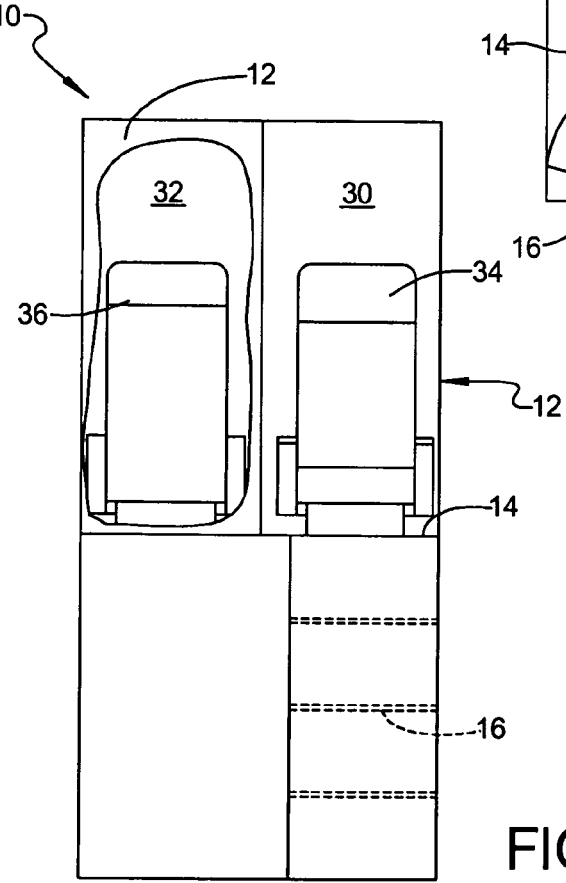
FIG. 5 is a front view of the module of FIG. 2 with a wall portion broken away to reveal one of the seats.

With reference specifically to FIGS. 3–5, the ability of the crew rest module 10 to allow occupants to simultaneously occupy the two crew rest compartments 30 and 32 is illustrated. Each crew member can assume either a seated position or a reclining position within his/her crew rest compartment 30 or 32. The crew rest compartments 30 and 32 are further formed such that they have approximately equal square footage, but are shaped with non-rectangular but symmetrical footprints such that floor end portions 40 and 42 have different widths. This enables an additional degree of shoulder room to be provided to each occupant while keeping the square footage of each crew rest compartment 30 and 32 approximately equal.

Referring further to FIG. 2, the elevated floor 14 of the crew rest module 10 enables a storage area 44 to be created between the stairways 16 and 18. In commercial aircraft applications, this storage area 44 is preferably of sufficient dimensions to receive one or more galley carts 45 for storage purposes.

The dimensions of the crew rest module 10 may be varied as needed and in accordance with the overall size and space available within the mobile platform in which the module 10 is employed. In one specific implementation, the crew rest module 10 has a footprint of approximately 80 in. by 52 in. (203 cm×132 cm) The non-rectangular configuration of each crew rest compartment enables each occupant to have an additional degree of shoulder room without interfering with the leg room afforded by the other crew rest compartment. In one specific implementation, the width at the shoulder area of each crew rest compartment is approximately 32 inches (81 cm). Each stairway 16 and 18 also preferably forms an opening of at least about 24 inches (61 cm) in width.

The crew rest module 10 thus provides a very compact footprint and makes highly efficient use of the overhead space available in a crown of a mobile platform, such as a commercial aircraft. This allows additional space on a main deck of a mobile platform to be freed up for revenue use. Combining seating and sleeping capability in each crew rest compartment 30 and 32 even further reduces the costs, overall weight and installation time for the module 10. Importantly, two crew members can occupy the module 10 simultaneously and each can enter and exit without disturbing the other.

Figure 6:
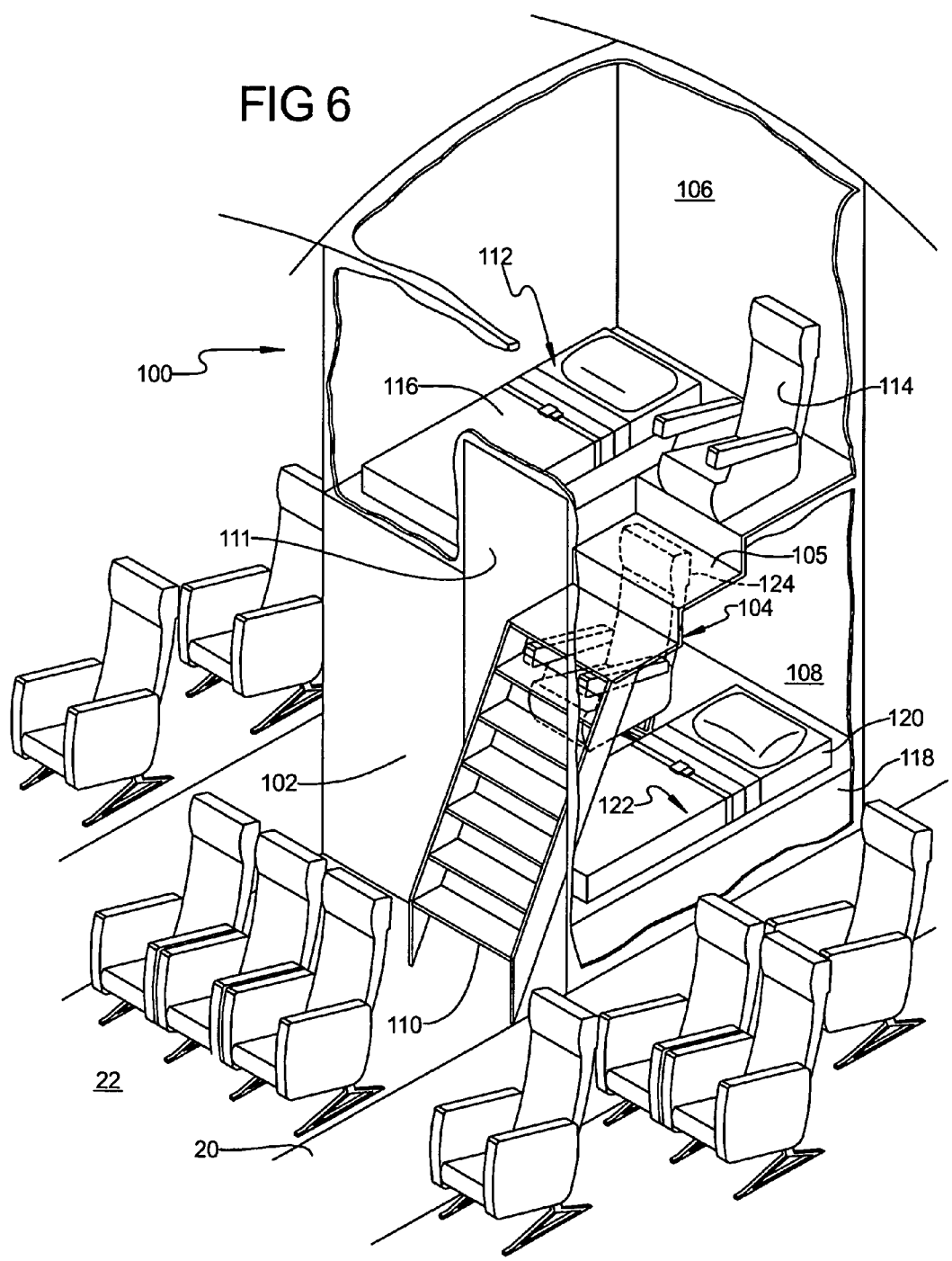
FIG. 6 is a front view of a crew rest module in accordance with an alternative preferred embodiment of the present invention.

Referring to FIGS. 6–10, a crew rest module 100 in accordance with an alternative preferred embodiment of the present invention is illustrated. Referring specifically to FIGS. 6 and 9, crew rest module 100 includes a peripheral wall structure 102 and a landing 104 having a step 105. The landing 104 cooperatively assists in forming an upper crew rest compartment 106 and a lower crew rest compartment 108 positioned below the upper crew rest compartment. The upper crew rest compartment 106 includes a stairway 110 that leads to the landing 104. A lateral wall portion 111 forms a support for a berth 112 and an adjacently positioned seat 114. The berth 112 preferably includes a cushion or foam surface 116 suitable for supporting an individual when the individual is laying down. The lower crew rest compartment 108 is configured similarly to the upper crew rest compartment 106 and also includes a wall portion 118 that supports a cushion 120 defining a berth 122, with the berth 122 being disposed laterally of a seat 124. In FIGS. 7, 8 and 10, the seats 114 and 124 can be seen to be staggered laterally such that berth 122 is disposed directly below seat 114, while berth 112 is disposed directly above seat 124. This staggered arrangement provides maximum headroom for each occupant when the occupant is seated in his/her seat 114 or 124. The stairway 110 may be fixed or movable and may also be arranged so as not to encroach at all on the berth 122 of the lower crew rest compartment 108. The module 100, in one specific implementation, has a footprint of about 80 inches by 52 inches (203 cm×132 cm).

The peripheral wall structure 12 or 102 can be made of any suitably strong, lightweight and fire retardant materials. In one preferred form the peripheral wall structures 12, 102 are made from a honeycomb Nomex® fiber core with a fiberglass skin. A plastic laminate can also be used over the fiberglass skin to provide a decorative surface.

The modules 10,100 thus also provide highly space efficient use of an area within a mobile platform and particularly within a commercial aircraft. Combining seating and sleeping areas within a common module reduces the overall costs, weight and installation for the module 10, 100 within any given form of mobile platform. Advantageously, the module 10, 100 can accommodate two individuals simultaneously and provide a degree of privacy for each individual. Furthermore, each individual can enter and exit the module 10, 100 without requiring the other occupant to first move from his or her seat or berth, and therefore without disturbing the other individual occupying the module 10, 100. The highly space efficient arrangement of the module 10, 100 allows maximum use of main deck space, and particularly of the crown area of a commercial aircraft.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A crew rest module adapted for use on a mobile platform, comprising:

a peripheral wall structure defining a crew rest area;

an elevated platform structurally coupled to said peripheral wall and forming a floor for said crew rest area so as to space said crew rest area above a floor of said mobile platform;

at least a partial wall dividing said crew rest area into first and second laterally adjacent, generally equally sized rest compartments and providing a degree of privacy to individuals occupying said rest compartments; and first and second stairways leading from said floor of said mobile platform to said elevated platform for providing separate ingress and egress to and from each of said first and second crew rest compartments.

2. The crew rest module of claim 1, wherein each said crew rest compartment includes a seat.

3. The crew rest module of claim 1, wherein each said crew rest compartment includes a reclining seat for functioning selectively as a seat or as a generally planar rest surface.

4. The crew rest module of claim 1, wherein said partial wall comprises a curtain.

5. The crew rest module of claim 1, wherein each of said first and second rest compartments defines a footprint having two longitudinal ends, with the two longitudinal ends being of different dimensions.

6. The crew rest module of claim 1, wherein said first and second crew rest compartments each include a chair, the chairs further being arranged to face towards each other.

* * * * *